Sept. 16, 1969  AKIKO KAWAWADA  3,467,245
SHOCK ABSORBING PACKAGE AND DISPLAY MEMBER
Filed May 28, 1968
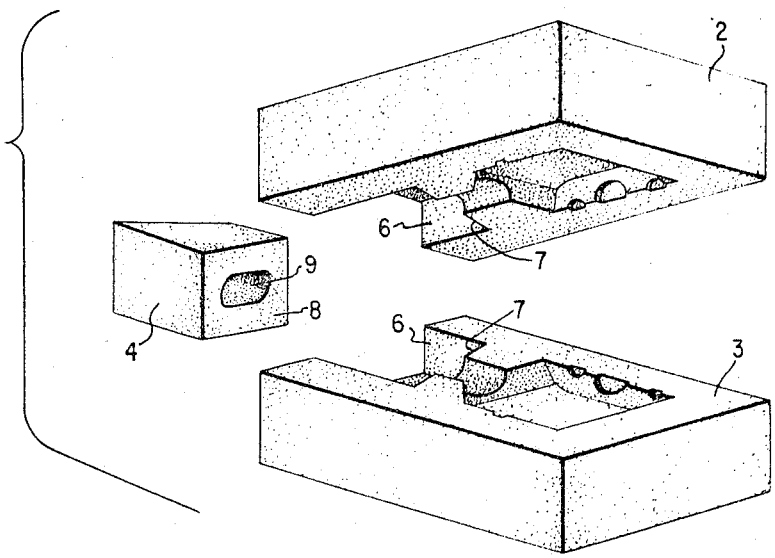
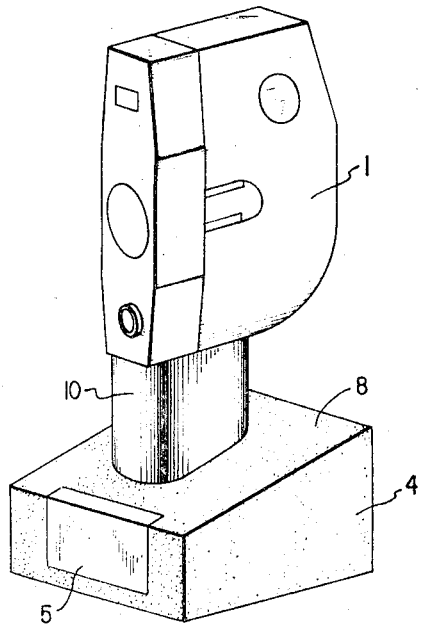
INVENTOR
AKIKO KAWAWADA
BY
ATTORNEYS.

United States Patent Office 3,467,245
Patented Sept. 16, 1969

3,467,245
SHOCK ABSORBING PACKAGE AND
DISPLAY MEMBER
Akiko Kawawada, Tokyo, Japan, assignor to Fuji Shashin
Film Kabushiki Kaisha, Kanagawa, Japan
Filed May 28, 1968, Ser. No. 732,712
Claims priority, application Japan, May 30, 1967,
42/45,723
Int. Cl. B65d 85/38, 5/52
U.S. Cl. 206—46                    2 Claims

ABSTRACT OF THE DISCLOSURE

A shock absorbing member of foamed polystyrene which also serves as a display support for displaying an article in standing position subsequent to opening the shock absorbing package.

---

Contoured blocks of foamed polystyrene have been employed in the packaging of articles for shipment wherein the articles are captured within the recesses of the adjoining shock absorbing members, and wherein subsequent to shipment, the packaging members are opened to remove the article for use or sale.

The present invention relates to the use of such shock absorbing members to package easily damaged articles, such as cameras, and more particularly, to a shock absorbing member of foamed polystyrene or the like which not only serves as one member or component of a complete shock absorbing package of foamed polystyrene in block form, but also serves as a display support for displaying the article carried by the case or block formed by the individual shock absorbing members. Specifically, the invention is directed to the improvement in a shock absorbing package comprsiing shock absorbing members having recesses conforming to the exterior shape of the article being carried thereby, wherein one of the shock absorbing members is provided with a flattened surface for stably supporting the article which has a portion carried by a recess on the opposed surface. Further, a surface other than the flat contact surface may be variably colored or may carry display information, etc.

These and other objects will be more apparent from the following description taken in conjunction with the accompanying drawing, in which:

FIGURE 1 is an exploded, perspective view of a shock absorbing package including the dual function shock absorbing member of the present invention.

FIGURE 2 is a perspective view of the dual function shock absorbing member in a display mode.

Referring to the drawings, the shock absorbing package of FIGURE 1 is formed of three shock absorbing members or components 2, 3 and 4, respectively, which are made of foamed polystyrene and molded into three interfitting and cooperating pieces. Internal recesses are molded into the members and configured to the outer shape of the article, in this case, camera 1, to be contained therein during shipment. The pieces or individual members 2 and 3 are so formed as to protect the opposite half sides of the article, in this case, the camera and shock absorbing member 4 is received within recess portions 6 within the bottom ends of members 2 and 3. It is further noted that the inner ends 7 of recesses 6 are inclined as is the upper or top surface 8 of the shock absorbing member 4. The bottom surface of the shock absorbing member 4 is flat as compared to the inclined surface 8. Recess 9 is formed within the inclined surface 8 to receive hand grip 10 of camera 1. The member 4 is molded into a rather attractive configuration and one or more surfaces thereof may be provided with a colored felt cloth and a label 5 which, in this case, is carried partially on the inclined upper surface 8 and the vertical surface adjacent thereto, as indicated in FIGURE 2. The label 5 may carry appropriate indicia describing the article 1, in this case, a camera, which is to be displayed subsequent to opening the package. The external shape of the three members or components of the shock absorbing package is cubic, when assembled, and thus, may be placed in a separate, much fancier box for shipment. With the article carried internally and the components 2, 3 and 4 in assembled form, the camera or other article 1 is tightly packaged with the foamed polystyrene protecting the article from mechanical shock. Upon opening of the package, the bottom end, in this case, handle 10, of camera 1 remains inserted within the recess 9 of the trapezoidal shock absorbing member 4 and with the colored felt cloth and label 5 carried thereon, the article may be readily displayed in upstanding fashion in a simple and expeditious manner.

Since a portion of the package and in particular, the shock absorbing member 4, readily serves as a display support, there is no need to provide an independent display support for the article other than the shock absorbing package. The invention is particularly adaptable to articles which are normally unstable for supporting in upright position, such as 8 mm. cameras and the like provided with a conventional hand grip section or portion on the bottom of the camera. The display support is quite effective since it supports the bottom end of the grip portion within the specially formed recess.

While the invention has been particularly shown and described with reference to a preferred embodiment, it will be understood by those skilled in the art that the foregoing and other changes in form and detail may be made therein without departing from the spirit and scope of the invention.

What is claimed is:

1. In a shock absorbing package comprising divisional members having internal recesses conforming to the exterior shape of a camera having a grip portion extending therefrom and carried therein and wherein said package includes opposed side members having interior recesses conforming to the major portion of the camera body, the improvement comprising: opposed interior recesses carried by said side shock absorbing members at one end thereof, a shock absorbing member of like configuration received within said end recesses, the bottom surface of said third member being flat for stably supporting the article for display of the same subsequent to opening of said package and a recess carried by said insertable shock absorbing member on the surface opposite of said flattened bottom for receiving the terminal end of the camera hand grip.

2. The shock absorbing package as claimed in claim 1 wherein one of said side surfaces of said insertable shock absorbing member carries a label descriptive of the article carried thereby.

References Cited

UNITED STATES PATENTS 3,061,089   10/1962   Higgins _____ 206—46
3,241,661   3/1956    Zamzow et al. _____ 206—46

JAMES B. MARBERT, Primary Examiner

U.S. Cl. X.R.
206—44